United States Patent
Hagawa et al.

(10) Patent No.: US 10,159,940 B2
(45) Date of Patent: Dec. 25, 2018

(54) METHOD FOR CLEANING HOLLOW FIBER MEMBRANE MODULE

(71) Applicant: TORAY INDUSTRIES, INC., Tokyo (JP)

(72) Inventors: Kazuki Hagawa, Otsu (JP); Kentaro Kobayashi, Otsu (JP); Hirofumi Morikawa, Otsu (JP); Hiroo Takabatake, Otsu (JP)

(73) Assignee: Toray Industries, Inc., Tokyo (JP)

( * ) Notice: Subject to any disclaimer, the term of this patent is extended or adjusted under 35 U.S.C. 154(b) by 518 days.

(21) Appl. No.: 14/779,793

(22) PCT Filed: Mar. 24, 2014

(86) PCT No.: PCT/JP2014/058022
§ 371 (c)(1),
(2) Date: Sep. 24, 2015

(87) PCT Pub. No.: WO2014/157057
PCT Pub. Date: Oct. 2, 2014

(65) Prior Publication Data
US 2016/0051937 A1 Feb. 25, 2016

(30) Foreign Application Priority Data

Mar. 25, 2013 (JP) ................. 2013-061435
Sep. 2, 2013 (JP) ................. 2013-180894

(51) Int. Cl.
*C02F 1/44* (2006.01)
*B01D 63/02* (2006.01)
*B01D 65/02* (2006.01)

(52) U.S. Cl.
CPC ............ *B01D 65/02* (2013.01); *B01D 63/02* (2013.01); *B01D 2313/21* (2013.01);
(Continued)

(58) Field of Classification Search
CPC .... B01D 65/02; B01D 63/02; B01D 2313/21; B01D 2321/185; B01D 2313/26;
(Continued)

(56) References Cited

U.S. PATENT DOCUMENTS 5,209,852 A * 5/1993 Sunaoka ................ B01D 65/02
210/321.69
2003/0038075 A1 2/2003 Akimoto et al.
(Continued)

FOREIGN PATENT DOCUMENTS

CN 1392802 1/2003
JP 02164423 6/1990
(Continued)

OTHER PUBLICATIONS

International Search Report for International Application No. PCT/JP2014/058022 dated Jun. 24, 2014.
First Office Action for CN201480017908.1 dated Jun. 3, 2016, 5 Pages.
(Continued)

*Primary Examiner* — David C Mellon
(74) *Attorney, Agent, or Firm* — RatnerPrestia (57) ABSTRACT

An efficient method is provided for cleaning hollow fiber membrane modules, the method being capable of efficiently removing substances accumulated inside hollow fiber membrane modules. The internal liquid on the raw liquid side of the hollow fiber membrane module (3) is discharged from a lower end face nozzle (19) of the hollow fiber membrane module (3) while air-cleaning is performed. The method for cleaning hollow fiber membrane modules is characterized in that the rate of liquid discharge from the lower end face nozzle of the hollow fiber membrane module (3) when discharging the internal liquid from the lower end face nozzle is adjusted so that the air supplied from the lower end face nozzle of the hollow fiber membrane module (3) through the aeration holes is supplied to the hollow fiber membrane module (3).

3 Claims, 3 Drawing Sheets

(52) U.S. Cl.
CPC .... *B01D 2313/26* (2013.01); *B01D 2321/185* (2013.01); *C02F 1/444* (2013.01); *C02F 2303/16* (2013.01)

(58) Field of Classification Search
CPC .............. B01D 63/022; B01D 2321/18; B01D 2321/10; B01D 2321/12; B01D 2321/16; C02F 2303/16; C02F 1/444
See application file for complete search history.

(56) References Cited

U.S. PATENT DOCUMENTS

| | | |
|---|---|---|
| 2010/0155334 A1 | 6/2010 | Taniguchi |
| 2013/0213887 A1* | 8/2013 | Morikawa ............ B01D 63/024 210/636 |

FOREIGN PATENT DOCUMENTS

| | | | |
|---|---|---|---|
| JP | 04126528 | 4/1992 | |
| JP | 2002045656 | 2/2002 | |
| JP | 2003265935 | 9/2003 | |
| JP | 2006281163 | 10/2006 | |
| JP | 2007289940 | 11/2007 | |
| JP | 2011115796 | 6/2011 | |
| JP | 2012115747 | 6/2012 | |
| WO | WO-2012056812 A1 * | 5/2012 | ........... B01D 63/024 |

OTHER PUBLICATIONS

English Translation of First Office Action for CN201480017908.1 dated Jun. 3, 2016, 7 Pages.

* cited by examiner

METHOD FOR CLEANING HOLLOW FIBER MEMBRANE MODULE

CROSS-REFERENCE TO RELATED APPLICATIONS

This is the U.S. National Phase application of PCT International Application No. PCT/JP2014/058022, filed Mar. 24, 2014, and claims priority to Japanese Patent Application No. 2013-061435, filed Mar. 25, 2013, and Japanese Patent Application No. 2013-180894, filed Sep. 2, 2013, the disclosures of each of these applications being incorporated herein by reference in their entireties for all purposes.

FIELD OF THE INVENTION

The present invention relates to a method for cleaning a hollow fiber membrane module in which a raw liquid is filtrated through hollow fiber membranes to gain a filtrate.

BACKGROUND OF THE INVENTION

The membrane separation process has characteristics of energy saving, space saving, an improvement in filtrated-water quality, and others, so that the use thereof has been increasing in various fields. For example, a microfiltration membrane or an ultrafiltration membrane is applied to a water-purifying process for producing industrial water or tap water from river water, ground water or treated waste water, or is applied to a pre-treatment in a seawater desalination reverse osmosis membrane treatment process.

When a raw liquid is filtrated through a membrane, the quantity of contaminants adhering to surfaces of the membrane or the inside of holes in the membrane increases in accordance with the liquid quantity filtrated through the membrane to cause a problem of lowering in the membrane filtrate quantity, or a rise in the membrane differential pressure.

Thus, the following cleaning has been put into practical use: air cleaning of introducing bubbles to the raw liquid side of membranes and swinging the membranes to bring the membranes into contact with each other, thereby scraping off contaminants adhering to the membranes; or physical cleaning of, for example, pushing a membrane filtrate or a clean liquid into a membrane along a direction reverse to a filtrating direction of the membrane to perform back-pressure washing for excluding contaminants adhering to surfaces of the membrane or the inside of holes in the membrane.

When the quantity of contaminants in a raw liquid is large, the above-mentioned cleaning method may not be sufficient to remove the contaminants adhering to the membrane surfaces. As a method for heightening the cleaning effect, Patent Documents 1 to 4 each describe a cleaning method of changing the liquid level at the raw liquid side of a membrane while bubbles are introduced thereinto from an air-diffusing device located inside a module of the membrane. Patent Document 5 suggests a cleaning method of raising and lowering the liquid level at the raw liquid side of a membrane while bubbles are introduced thereinto from an air-diffusing device located at the lower part of a module of the membrane. These methods make use of pulsatory motions of the liquid surface on the basis of waves generated when the bubbles break down in the liquid surface, thereby aiming to produce an advantageous effect of peeling off contaminants adhering to the membrane surface intensely.

PATENT DOCUMENTS

Patent Document 1: JP 2007-289940 A
Patent Document 2: JP 2006-281163 A
Patent Document 3: JP 02-164423 A
Patent Document 4: JP 04-126528 A
Patent Document 5: JP 2003-265935 A

SUMMARY OF THE INVENTION

However, according to the method as described in Patent Documents 1 to 4, which is a method of changing the liquid level at the raw liquid side of a membrane while bubbles are introduced thereinto from an air-diffusing device located inside a module of the membrane, some cleaning effect is produced. However, it cannot be said that this effect is sufficient.

In a case as described in Patent Document 5, which is a case of lowering the liquid level at the raw liquid side of a membrane while bubbles are introduced from an air-diffusing device located at the lower part of a module of the membrane into the membrane module, the bubbles are not introduced into the membrane nodule through aeration holes in the membrane module, so that air cleaning cannot be attained. This causes a problem that substances accumulated inside the membrane module cannot be sufficiently removed to make it impossible to stabilize the operation of the hollow fiber membranes sufficiently.

The present invention provides a method for cleaning a hollow fiber membrane module, that is capable of introducing bubbles sufficiently into the membrane module, this method being a method of discharging an internal liquid at a raw liquid side of the hollow fiber membrane module from the lower part of the hollow fiber membrane module while the bubbles are introduced thereinto from an air-diffusing device located at the lower part of the membrane module.

In order to solve the problems, the method of the present invention for cleaning a hollow fiber membrane module includes the following:

(1) A method for cleaning a hollow fiber membrane module, the module including: a cylindrical case having, in a side face thereof, an upper side face nozzle and a lower side face nozzle, having, in an upper end face, an upper end face nozzle and having, in a lower end face, a lower end face nozzle; and a hollow fiber membrane bundle including a plurality of hollow fiber membranes and inserted into the cylindrical case, wherein: in an upper end portion of the hollow fiber membrane bundle, an upper membrane-bonded section is formed, the section being bonded and fixed to the cylindrical case with an adhesive in a state where respective end faces of the hollow fiber membranes are opened; in a lower end portion of the hollow fiber membrane bundle, a lower membrane-bonded section is formed, the section being bonded and fixed to the cylindrical case with an adhesive in a state where respective end faces of the hollow fiber membranes are closed; and a plurality of aeration holes are made in the lower membrane-bonded section; and in the method, while air is supplied through the lower end face nozzle, an internal liquid inside the cylindrical case is discharged through the lower end face nozzle; and the internal liquid at a raw liquid side of the hollow fiber membranes in the cylindrical case is discharged through the lower end face nozzle to cause the rate of liquid discharge V (m³/sec) of the internal liquid to satisfy the following relational expression relatively to a maximum value Lmax (m) out of respective minimum diameters of the aeration holes, and the total sectional area S (m$^2$) of the aeration holes, thereby air-cleaning the hollow fiber membrane module: $0.00001$ (m$^3$/sec)$\leq$V (m$^3$/sec)$<$S (m$^2$)$\times 5.5$ (m$^{0.5}$/sec)$\times$ Lmax$^{0.5}$ (m$^{0.5}$).

(2) The method for cleaning a hollow fiber membrane module according to claim 1, wherein the cleaning recited in item (1) is performed while the internal liquid in the cylindrical case is lowered.

(3) The method for cleaning a hollow fiber membrane module according to claim 1, wherein the cleaning recited in item (1) is performed while back-pressure washing is performed, the back-pressure washing being washing of supplying a backwashing liquid through the upper end face nozzle to be transmitted from a filtrate side of the hollow fiber membrane to the raw liquid side thereof.

The method of the present invention for cleaning a hollow fiber membrane module makes it possible to introduce bubbles sufficiently into the membrane module while discharging the internal liquid at the raw liquid side of the hollow fiber membranes through the lower end face nozzle, so as to remove substances accumulated in the hollow fiber membrane module efficiently. Thus, the method can contribute to stable operation of the hollow fiber membrane module.

According to the cleaning method of item (3), which is an aspect of the method of the present invention for cleaning a hollow fiber membrane module, the waste cleaning liquid is discharged not only from the upper side of the hollow fiber membrane module but also from the lower side of the module while the back-pressure washing and the air cleaning are simultaneously performed. This manner makes it possible to remove substances accumulated in the hollow fiber membrane module efficiently.

DETAILED DESCRIPTION OF EMBODIMENTS OF THE INVENTION

Hereinafter, the present invention will be described in more detail on the basis of embodiments demonstrated in the drawings. The invention is not limited to the embodiments.

Figure 1:
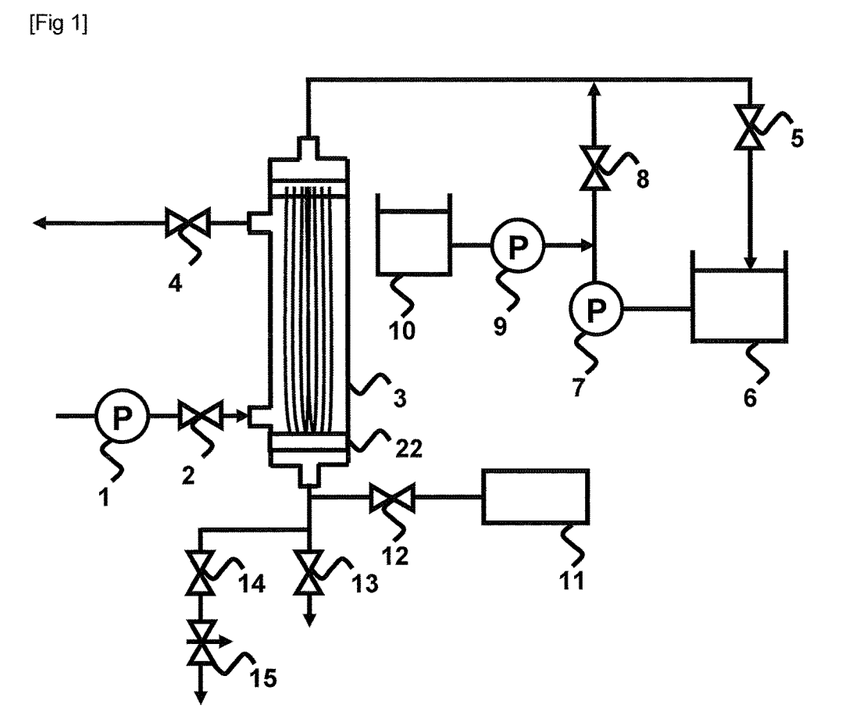
FIG. 1 is a schematic apparatus flowchart illustrating an example of a membrane filtration apparatus to which the present invention is applied.

As illustrated in FIG. 1, a membrane filtration apparatus to which the method of the present invention for cleaning a hollow fiber membrane module is applied is provided with, for example, the following: a raw liquid supplying pump 1 for supplying a raw liquid; a raw liquid valve 2 that is opened when the raw liquid is supplied; a hollow fiber membrane module 3 through which the raw liquid is filtrated; an air release valve 4 that is opened in the case of supplying the raw liquid, or performing back-pressure washing (hereinafter also referred to as "backwashing") or air cleaning (hereinafter also referred to as "air-used cleaning"); a filtrate valve 5 that is opened when membrane filtration is performed; a filtrate storage tank 6 in which a membrane filtrate is stored; a backwash pump 7 for supplying the membrane filtrate to the hollow fiber membrane module 3 to perform back-pressure washing of the module; a backwash valve 8 that is opened when the back-pressure washing is performed; a chemical liquid supplying pump 9 for supplying a chemical liquid to the raw liquid or the hollow fiber membrane module; a chemical liquid storage tank 10 in which the chemical liquid is stored; an air blower 11 that is an air-supplying source for the air cleaning of the hollow fiber membrane module 3; an air-scrub valve 12 that is opened when air is supplied to a lower part (a lower end face nozzle) of the hollow fiber membrane module 3 to air-clean the module; a liquid discharging valve 13 that is opened in the case of discharging the raw liquid at the primary side (the raw liquid side) of the hollow fiber membrane module 3; a lower waste cleaning liquid valve 14 that is opened in the case of discharging waste cleaning liquid from a lower part of the module 3 (a lower end face nozzle of the hollow fiber membrane module 3) while back-pressure washing and air cleaning are simultaneously performed; and a flow rate adjusting valve 15.

In the present specification, a liquid to be supplied for membrane separation into a hollow fiber membrane is represented by the wording "raw liquid"; a cleaning method of performing air cleaning while a liquid is discharged from the lower part of a hollow fiber membrane module, by the wording "air cleaning liquid discharging method"; and a cleaning method of performing back-pressure washing and air cleaning while a liquid is discharged from the upper and lower parts of a hollow fiber membrane module, by the wording "simultaneous air cleaning/back-pressure washing liquid discharging method." Moreover, a liquid at the raw liquid side of a hollow fiber membrane module that is discharged by the air cleaning liquid discharging method and the simultaneous air cleaning/back-pressure washing liquid discharging method is represented by the wording "internal liquid"; and a liquid used when back-pressure washing (backwashing) is performed, by the wording "backwashing liquid." The backwashing liquid is any liquid as far as the liquid is a clean and clear liquid. The backwashing liquid is preferably membrane-filtrated water.

Figure 2:
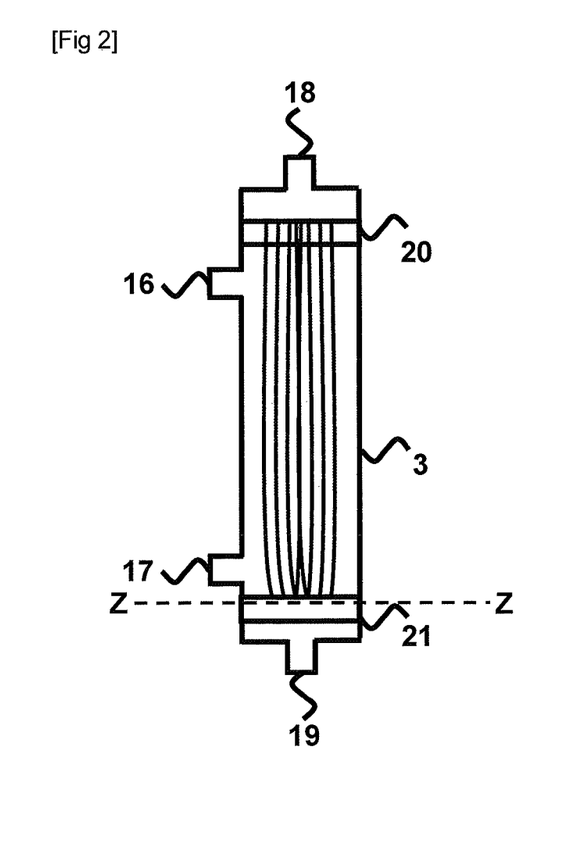
FIG. 2 is schematic cross-sectional view illustrating an example of a pressurizing-type hollow fiber membrane module to which the present invention is applied.

FIG. 2 is a schematic cross-sectional view illustrating an example of a pressurizing-type hollow fiber membrane module. This hollow fiber membrane module 3 has an upper membrane-bonded section 20 in which many hollow fiber membranes are bonded and fixed to a cylindrical case with an adhesive in the state of being opened, and a lower membrane-bonded section 21 in which respective end faces of the hollow fiber membranes are bonded and fixed to the cylindrical case with an adhesive in the state of being closed. A plurality of aeration holes 22 are made in the lower membrane-bonded section 21. The hollow fiber membrane module 3 has an upper end face nozzle 18 that functions as a filtrate discharge port or a backwashing liquid supply port, a lower end face nozzle 19 that functions as an air supply port or a lower liquid discharge port, an upper side face nozzle 16 through which waste cleaning liquid and air are discharged, and a lower side face nozzle 17 that functions as a raw liquid supply port.

In this membrane filtration apparatus, a raw liquid is supplied to the primary side of the membranes in the hollow fiber membrane module 3 by operating the raw liquid supplying pump 1 and opening the raw liquid valve 2 and the air release valve 4. The air release valve 4 is closed, and subsequently the filtrate valve 5 is opened to filtrate the raw liquid through the hollow fiber membranes located inside the hollow fiber membrane module 3. The resultant filtrate is shifted from the secondary side (filtrate side) of the membranes in the hollow fiber membrane module 3 through the filtrate valve 5 into the filtrate storage tank 6. In the case of dead end filtration, closed are all of the air release valve 4, the backwash valve 8, the air-scrub valve 12, the liquid discharging valve 13 and the lower waste cleaning liquid valve 14. It is preferred to set the filtration period appropriately in accordance with the nature of the raw liquid, and the membrane filtration flux. The filtration period may be continued until the membrane filtration differential pressure reaches a predetermined differential pressure.

The following will describe a first aspect of the present invention.

The first aspect of the invention is a method for cleaning a hollow fiber membrane module, the module including: a cylindrical case having, in a side face thereof, an upper side face nozzle and a lower side face nozzle, having, in an upper end face, an upper end face nozzle and having, in a lower end face, a lower end face nozzle; and a hollow fiber membrane bundle including a plurality of hollow fiber membranes and inserted into the cylindrical case, wherein: in an upper end portion of the hollow fiber membrane bundle, an upper membrane-bonded section is formed, the section being bonded and fixed to the cylindrical case with an adhesive in a state where respective end faces of the hollow fiber membranes are opened; in a lower end portion of the hollow fiber membrane bundle, a lower membrane-bonded section is formed, the section being bonded and fixed to the cylindrical case with an adhesive in a state where respective end faces of the hollow fiber membranes are closed; and a plurality of aeration holes are made in the lower membrane-bonded section; and in the method, while air is supplied through the lower end face nozzle, an internal liquid inside the cylindrical case is discharged through the lower end face nozzle; and the internal liquid at a raw liquid side of the hollow fiber membranes in the cylindrical case is discharged through the lower end face nozzle to cause the rate of liquid discharge V (m$^3$/sec) of the internal liquid to satisfy the following relational expression relatively to a maximum value Lmax (m) out of respective minimum diameters of the aeration holes, and the total sectional area S (m$^2$) of the aeration holes, thereby air-cleaning the hollow fiber membrane module: 0.00001 (m$^3$/sec)≤V (m$^3$/sec)<S (m$^2$)×5.5 (m$^{0.5}$/sec)×Lmax$^{0.5}$ (m$^{0.5}$).

In the first aspect of the invention, the filtrate valve 5 is closed to stop the raw liquid supplying pump 1, thereby stopping a filtrating step through the hollow fiber membrane module 3. Thereafter, the air release valve 4, the lower waste cleaning liquid valve 14 and the air-scrub valve 12 are opened to activate the air blower 11. At this time, waste cleaning liquid is discharged through the lower end face nozzle 19 of the hollow fiber membrane module 3. Additionally, the following adjustment is made while the waste cleaning liquid is discharged through the lower end face nozzle 19 of the hollow fiber membrane module 3: in order to supply air into the hollow fiber membrane module 3, at the time of the liquid discharge through the lower end face nozzle of the hollow fiber membrane module 3, the flow rate adjusting valve 15 is used to adjust the rate of liquid discharge V through the lower end face nozzle, relatively to the maximum value Lmax of the respective minimum diameters of the aeration holes, to satisfy a relational expression of V (m$^3$/sec)<S (m$^2$)×5.5 (m$^{0.5}$/sec)×Lmax$^{0.5}$ (m$^{0.5}$). By performing the liquid discharge from the lower part of the hollow fiber membrane module while carrying out air cleaning, suspended matters accumulated in the lower part of the hollow fiber membrane module can be efficiently removed.

The following will describe a third aspect of the invention (details of a second aspect of the invention will be described later).

The third aspect of the invention is a preferred embodiment of the first aspect of the present invention.

The third aspect of the invention is a method for cleaning a hollow fiber membrane module, the module including: a cylindrical case having, in a side face thereof, an upper side face nozzle and a lower side face nozzle, having, in an upper end face, an upper end face nozzle and having, in a lower end face, a lower end face nozzle; and a hollow fiber membrane bundle including a plurality of hollow fiber membranes and inserted into the cylindrical case, wherein: in an upper end portion of the hollow fiber membrane bundle, an upper membrane-bonded section is formed, the section being bonded and fixed to the cylindrical case with an adhesive in a state where respective end faces of the hollow fiber membranes are opened; in a lower end portion of the hollow fiber membrane bundle, a lower membrane-bonded section is formed, the section being bonded and fixed to the cylindrical case with an adhesive in a state where respective end faces of the hollow fiber membranes are closed; and a plurality of aeration holes are made in the lower membrane-bonded section; and in the method, back-pressure washing and air cleaning are simultaneously performed, the former being washing of supplying a backwashing liquid through the upper end face nozzle to be transmitted from a filtrate side of the hollow fiber membranes to a raw liquid side thereof, and the latter being cleaning of supplying air through the lower end face nozzle; and when an internal liquid is discharged through the upper side face nozzle and the lower end face nozzle to the outside of the hollow fiber membrane module, the rate of liquid discharge V (m$^3$/sec) through the lower end face nozzle is adjusted to satisfy the following relational expression relatively to a maximum value Lmax (m) out of respective minimum diameters of the aeration holes, and the total sectional area S (m$^2$) of the aeration holes: 0.00001 (m$^3$/sec)≤V (m$^3$/sec)<S (m$^2$)×5.5 (m$^{0.5}$/sec)×Lmax$^{0.5}$ (m$^{0.5}$).

In short, the third aspect of the invention is a method for cleaning a hollow fiber membrane module, in which in the hollow fiber membrane module cleaning method of the first aspect of the invention, the cleaning recited in claim 1 is performed while back-pressure washing is performed. The back-pressure washing is washing of supplying a backwashing liquid through the upper end face nozzle to be transmitted from the filtrate side of the hollow fiber membranes to the raw liquid side thereof.

In the third aspect of the invention, the raw liquid valve 2 and the filtrate valve 5 are closed to stop the raw liquid supplying pump 1, thereby stopping a filtrating step through the hollow fiber membrane module 3. Thereafter, the air release valve 4, the lower waste cleaning liquid valve 14, the backwash valve 8 and the air-scrub valve 12 are opened to activate the backwash pump 7 and the air blower 11. In this way, waste cleaning liquid is discharged from the upper side (the upper side face nozzle 16) of the hollow fiber membrane module 3 and the lower side (the lower end face nozzle 19) thereof while air cleaning is performed simultaneously with back-pressure washing using the membrane filtrate inside the filtrate storage tank 10. Additionally, the following adjustment is made while the waste cleaning liquid is discharged from the lower side (the lower end face nozzle 19) of the hollow fiber membrane module 3: in order to supply air into the hollow fiber membrane module 3, at the time of performing the liquid discharge from the lower side (the lower end face nozzle) of the hollow fiber membrane module 3, the flow rate adjusting valve 15 is used to adjust the rate of liquid discharge V through the lower end face nozzle, relatively to the maximum value Lmax of the respective minimum diameters of the aeration holes, to satisfy a relational expression of V (m$^3$/sec)<S (m$^2$)×5.5 (m$^{0.5}$/sec)×Lmax$^{0.5}$ (m$^{0.5}$). In other words, the inventors have found out that whether or not air is supplied to the hollow fiber membrane module 3 depends on a relationship between the buoyancy (bubble diameter) of the air (bubbles) and force applied to the air (bubbles) based on water flow from above the air, and the inventors have experimentally found out the above-mentioned relational expression as conditions for supplying the air to the hollow fiber membrane module 3, this expression being about the rate of liquid discharge V in the aeration holes, the total sectional area S of the aeration holes 22, and the maximum value Lmax of the respective minimum diameters of the aeration holes.

The "rate of liquid discharge through the lower end face nozzle" is generally equal to the "rate of liquid discharge in the aeration holes."

The aeration holes 22 made in the lower membrane-bonded and fixed section of the hollow fiber membrane module used in an embodiment of the present invention are holes penetrating the lower membrane-bonded and fixed section of the hollow fiber membrane module. The shape of a cross section of each of the aeration holes may be any shape, such as a circular, elliptic or polygonal shape.

Figure 3:
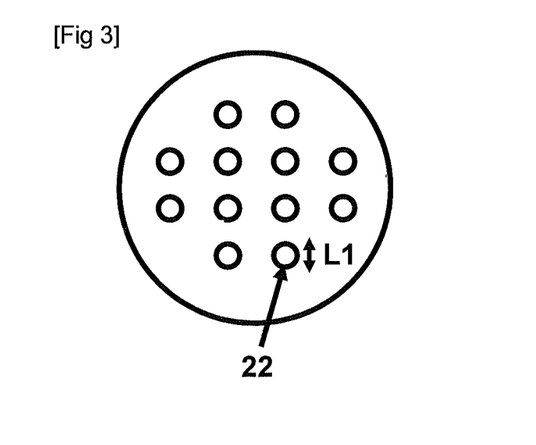
FIG. 3 is an example of a schematic cross-sectional view obtained by viewing, from below the hollow fiber membrane module, a cross section of the hollow fiber membrane module when the module is cut on line ZZ in the schematic cross-sectional view of FIG. 2.
Figure 4:
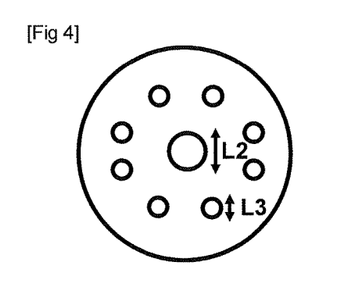
FIG. 4 is another example of a schematic cross-sectional view obtained by viewing, from below the hollow fiber membrane module, across section of the hollow fiber membrane module when the module is cut on line ZZ in the schematic cross-sectional view of FIG. 2.
Figure 5:
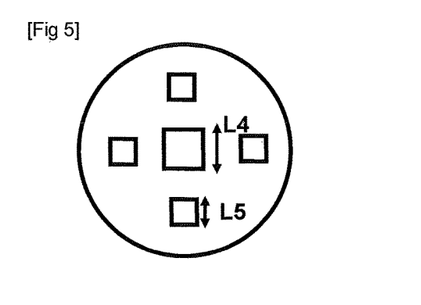
FIG. 5 is still another example of a schematic cross-sectional view obtained by viewing, from below the hollow fiber membrane module, a cross section of the hollow fiber membrane module when the module is cut on line ZZ in the schematic cross-sectional view of FIG. 2.

In the above-mentioned expression, V is the rate of liquid discharge (m$^3$/sec) through the lower end face nozzle when the liquid is discharged from the lower side (the lower end face nozzle) of the hollow fiber membrane module 3 in the cleaning. Lmax is the maximum value (m) of the respective minimum diameters of the aeration holes 22. S is the total sectional area (m$^2$) of the aeration holes 22. The value 5.5 (m$^{0.5}$/sec) is a coefficient obtained at the time of obtaining a relational expression having the highest correlation with experimental values Lmax, V and S when air is supplied to the hollow fiber membrane module 3. The minimum diameter of each of the aeration holes 22 is a length that is equal to the minimum width of the aeration holes 22 in a direction perpendicular to the flowing direction of the discharged liquid in the aeration holes 22. When the shape of a cross section of the aeration hole 22 is, for example, circular, the minimum diameter is the length of the diameter thereof. When the shape is an elliptical shape, the minimum diameter is the length of the short axis thereof. When the shape is a polygon having sides the number of which is even, the minimum diameter is the interval between any opposed sides. When the shape is a polygon having sides the number of which is odd, the minimum diameter is the distance between any one out of apexes thereof and a side opposed to the apex. As illustrated in FIG. 3, when all of the aeration holes 22 are circular and the respective diameters thereof are equal to one another, the maximum value of the minimum diameters is L1. As illustrated in FIG. 4, when all of the aeration holes 22 are circular and the respective diameters thereof are different from each other, the maximum value is L2. When the aeration holes 22 are in a form as illustrated in FIG. 5, the maximum value is L4. In the case illustrated in FIG. 3, the total sectional area S of the aeration holes 22 can be calculated by 12×π×L1$^2$/4 (m$^2$); in the case illustrated in FIG. 4, the total sectional area can be calculated by it π×L2$^2$/4+8×π×L3$^2$/4 (m$^2$) and in the case illustrated in FIG. 5, the total sectional area can be calculated by L4$^2$+4×L5$^2$ (m$^2$).

When the liquid is discharged under a condition that the rate of liquid discharge V (m$^3$/sec) through the lower end face nozzle is S×5.5×L$^{0.5}$ or more, air is not sufficiently supplied into the hollow fiber membrane module 3 to clean the hollow fiber membrane module 3 insufficiently. When the liquid is discharged under a condition that the rate of liquid discharge V (m$^3$/sec) through the lower end face nozzle is less than 0.00001 (m$^3$/sec), substances accumulated in the lower part of the hollow fiber membrane module are not sufficiently discharged, so that the cleaning becomes insufficient.

The simultaneous air cleaning/back-pressure washing liquid discharging method may be performed any number of times after the end of the filtration over a predetermined period, or may be frequently performed in combination with a different cleaning method. The period for the cleaning step may be set at will. From the viewpoint of recovery rate, the period is preferably from about 30 seconds to about 3 minutes.

After the end of the cleaning, the following liquid discharging step, liquid supplying step and filtrating step may be performed:

The backwash valve 8, the air-scrub valve 12 and the lower waste cleaning liquid valve 14 are closed to stop the backwash pump 7 and the air blower 11, and subsequently the liquid discharging valve 13 turns open to perform a liquid discharging step. After the end of the liquid discharging step, the liquid discharging valve 13 and the raw liquid valve 2 turn close and open, respectively, so that the raw liquid supplying pump 1 is activated to perform a liquid supplying step. The primary side of the membranes in the hollow fiber membrane module 3 is filled with the liquid, and subsequently the air release valve 4 and the filtrate valve 5 turn close and open, respectively, to return the process to the filtrating step. These steps are repeated.

When the cleaning step in the present invention is performed, the cleaning effect can be heightened by using the filtrate containing a chemical liquid.

The chemical liquid may be an aqueous solution containing one or more chemical agents, such as hydrochloric acid, sulfuric acid, nitric acid, citric acid, oxalic acid, ascorbic acid, sodium sulfite, sodium hydroxide, and/or sodium hypochlorite.

The following will describe the second aspect of the invention.

The second aspect of the invention is another preferred embodiment of the first aspect of the invention.

The second aspect of the invention is a method for cleaning a hollow fiber membrane module, the module including: a cylindrical case having, in a side face thereof, an upper side face nozzle and a lower side face nozzle, having, in an upper end face, an upper end face nozzle and having, in a lower end face, a lower end face nozzle; and a hollow fiber membrane bundle including a plurality of hollow fiber membranes and inserted into the cylindrical case, wherein: in an upper end portion of the hollow fiber membrane bundle, an upper membrane-bonded section is formed, the section being bonded and fixed to the cylindrical case with an adhesive in a state where respective end faces of the hollow fiber membranes are opened; in a lower end portion of the hollow fiber membrane bundle, a lower membrane-bonded section is formed, the section being bonded and fixed to the cylindrical case with an adhesive in a state where respective end faces of the hollow fiber membranes are closed; and a plurality of aeration holes are made in the lower membrane-bonded section; and in the method, while air is supplied through the lower end face nozzle, a liquid level of an internal liquid inside the cylindrical case is lowered and simultaneously the internal liquid at a raw liquid side of the hollow fiber membranes in the cylindrical case is discharged through the lower end face nozzle to cause the rate of liquid discharge V (m³/sec) of the internal liquid to satisfy the following relational expression, relatively to a maximum value Lmax (m) out of respective minimum diameters of the aeration holes and the total sectional area S (m²) of the aeration holes, thereby air-cleaning the hollow fiber membrane module: $0.00001$ (m³/sec)$\leq$V (m³/sec)$<$S (m²)$\times 5.5$ (m$^{0.5}$/sec)$\times$Lmax$^{0.5}$ (m$^{0.5}$)

In short, the second aspect of the invention is the hollow fiber membrane module cleaning method of the first aspect wherein the cleaning recited in claim 1 is performed while the internal liquid in the cylindrical case is lowered in the hollow fiber membrane module cleaning method.

The cleaning method according to the second aspect of the invention may be used singly. It is preferred from the viewpoint of suspended matter discharging performance from the hollow fiber membrane module to perform the cleaning method according to the second aspect of the invention after the above-mentioned cleaning method (the cleaning method according to the first or third aspect of the invention). Hereinafter, the second aspect will be described with reference to a specific example thereof. However, the invention is not limited to the specific example.

After the above-mentioned cleaning method (the cleaning method according to the first or third aspect of the invention) is performed, the state where the lower waste cleaning liquid valve 14, the air-scrub valve 12 and the air release valve 4 are open is kept, and further the state where the air blower 11 is activated is kept. In these states, while the liquid level of the internal liquid at the primary side of the membranes in the hollow fiber membrane module 3 is lowered, air cleaning and liquid discharge are performed. Additionally, in order to supply air to the hollow fiber membrane module 3 while the internal liquid is discharged from the lower side of the hollow fiber membrane module 3, the following is performed: at the time of discharging the internal liquid from the lower side of the hollow fiber membrane module 3, the flow rate adjusting valve 15 is used to adjust the discharged liquid quantity of the internal liquid to cause the rate of liquid discharge (m³/sec) of the internal liquid through the lower end face nozzle to satisfy the above-mentioned relational expression, relatively to a maximum value Lmax of the respective diameters of the aeration holes and the total sectional area S (m²) of the aeration holes; simultaneously, the air is supplied through the lower end face nozzle 19.

After the end of the liquid discharge, the air-scrub valve 12 and the lower waste cleaning liquid valve 14 are closed to stop the air blower 11, and subsequently the raw liquid valve 2 is opened to activate the raw liquid supplying pump 1, thereby performing a liquid supplying step. After the primary side of the membranes in the hollow fiber membrane module 3 is filled with the liquid, the air release valve 4 is closed and the filtrate valve 5 is opened to return the process to the filtrating step. The filtration is continued until the membrane filtration differential pressure reaches a predetermined differential pressure.

As described above, the timing to perform the cleaning method (the air cleaning and liquid discharging method) according to the second aspect of the invention is not particularly limited. This method may be performed after a simultaneous air cleaning/back-pressure washing liquid discharging method, or before a simultaneous air cleaning/back-pressure washing liquid discharging method. The period for the air cleaning and liquid discharging step may be set at will. It is preferred to set the period to a period sufficient for discharging the internal liquid in the hollow fiber membrane module 3.

The diameter of pores in the hollow fiber membranes used in the hollow fiber membrane module 3 used in the present invention is not particularly limited as far as the diameter permits the membranes to be porous. In accordance with desired liquid qualities or a desired liquid amount of a liquid to be treated, an MF membrane (microfiltration membrane) or a UF membrane (ultrafiltration membrane) is used, or both of these filtration membranes are used in combination. For example, in the case of desiring to remove suspended matter components, colon bacilli, Cryptosporidia or the like, either an MF membrane or a UF membrane may be used. In the case of desiring to remove viruses, polymeric organic substances, and others also, it is preferred to use a UF membrane.

The material of the hollow fiber membranes used in the present invention is preferably a material containing at least one selected from the group consisting of polyethylene, polypropylene, polyacrylonitrile, ethylene/tetrafluoroethylene copolymer, polychlorotrifluoroethylene, polytetrafluoroethylene, polyvinyl fluoride, tetrafluoroethylene/hexafluoropropylene copolymer, tetrafluoroethylene/perfluoroalkyl vinyl ether copolymer, chlorotrifluoroethylene/ethylene copolymer, polyvinylidene fluoride, polysulfone, cellulose acetate, polyvinyl alcohol and polyethersulfone, and inorganic materials such as ceramic materials. From the viewpoint of the strength of the membranes and the chemical agent resistance thereof, polyvinylidene fluoride (PVDF) is more preferred. From the viewpoint of high lyophilicity and an intense fouling resistance thereof, polyacrylonitrile is more preferred.

The method used in the present invention for filtration flux control may be constant-flux filtration or constant-pressure filtration. The constant-flux filtration is preferred since a constant treated liquid quantity is obtained and further the whole is easily controlled.

The manner for the filtration may be a dead end filtration type module or a crossflow filtration type module. The dead end filtration type module is preferred since the energy consumption amount therein is small.

The cleaning method of the present invention makes it possible to decompose and remove substances accumulated in the hollow fiber membrane module effectively to stabilize the membrane filtration differential pressure over a longer term than the prior art.

EXAMPLES

Method for Evaluating Membrane Filtration Differential Pressure

Pressure meters were set, respectively, to a raw liquid supplying pipe (at the primary side of the membranes) connected to the hollow fiber membrane module 3, and a membrane filtrate pipe (at the secondary side of the membranes). The differential pressure was calculated out by subtracting the pressure at the secondary side of the membranes from that at the primary side thereof.

Example 1

In the apparatus illustrated in FIG. 1, four transparent hollow fiber membrane modules were each used. The modules were equal to one another in total sectional area S of their aeration holes each having a sectional shape as illustrated in FIG. 3. The respective minimum diameters of aeration holes of these modules were different in maximum value from each other. The maximum values were 0.003, 0.005, 0.01 and 0.03 m, respectively. The air release valve 4, the lower waste cleaning liquid valve 14, the backwash valve 8 and the air-scrub valve 12 were opened to activate the backwash pump 7 and the air blower 11, thereby performing back-pressure washing at a flux of 3.3 m$^3$/(m$^2$·d), and air cleaning at each of respective air flow rates of 20, 50, 100 and 200 NL/min (the symbol "NL/min" represents "normal liter per minute") for 60 seconds.

At this time, measurement was made about the rate of liquid discharge V (m$^3$/sec) from the lower side of the hollow fiber membrane module that was a rate at which air supplied from the lower side of the hollow fiber membrane module came not to be supplied into the hollow fiber membrane module.

In other words, measurement was made about the rate of liquid discharge V (m$^3$/sec) through the lower end face nozzle when air supplied from the lower side of the hollow fiber membrane module came not to be supplied into the hollow fiber membrane module. Specifically, the flow rate adjusting valve 15 was initially closed, and it was verified that the air supplied from the lower side (the lower end face nozzle) of the hollow fiber membrane module was supplied into the hollow fiber membrane module. Thereafter, the flow rate adjusting valve 15 was opened to vary the rate of liquid discharge V (m$^3$/sec) through the lower end face nozzle. The rate of liquid discharge (m$^3$/sec) through the lower end face nozzle when the air supplied from the lower side (the lower end face nozzle) of the hollow fiber membrane module came not to be supplied into the hollow fiber membrane module was obtained. It was visually checked whether or not the air was supplied into the hollow fiber membrane module.

Figure 6:
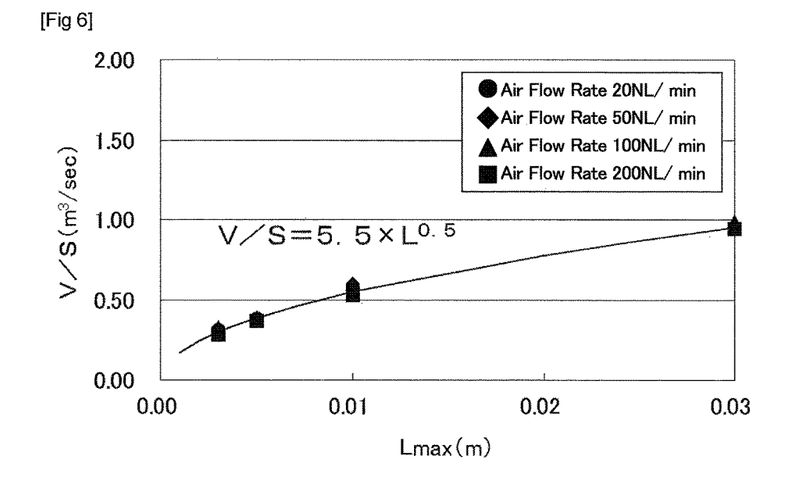
FIG. 6 is a graph showing a relationship between the following: a maximum value Lmax out of respective minimum diameters of aeration holes, this value having been calculated out in Example 1; the total sectional area S of the aeration holes; and the rate V of liquid discharge through a lower end face nozzle.

The results are shown in FIG. 6.

In the case of using one of the hollow fiber membrane modules, the maximum value of the minimum diameters of aeration holes of which was 0.003 m, and setting the air flow rate to respective values of 20, 50, 100 and 200 NL/min, the individual rates of liquid discharge V (V/S in FIG. 6) were substantially equal to one another.

In the same way, in the case of using one of the hollow fiber membrane modules, the maximum value of the minimum diameters of aeration holes of which was 0.005 m, and setting the air flow rate to respective values of 20, 50, 100 and 200 NL/min, the individual rates of liquid discharge V (V/S in FIG. 6) were substantially equal to one another.

In the same way, in the case of using one of the hollow fiber membrane modules, the maximum value of the minimum diameters of aeration holes of which was 0.01 m, and setting the air flow rate to respective values of 20, 50, 100 and 200 NL/min, the individual rates of liquid discharge V (V/S in FIG. 6) were substantially equal to one another.

In the same way, in the case of using one of the hollow fiber membrane modules, the maximum value of the minimum diameters of aeration holes of which was 0.03 m, and setting the air flow rate to respective values of 20, 50, 100 and 200 NL/min, the individual rates of liquid discharge V (V/S in FIG. 6) were substantially equal to one another.

At the time of discharging waste cleaning liquid from the upper side (the upper side face nozzle) and the lower side (the lower side face nozzle) of the hollow fiber membrane module to the outside of the hollow fiber membrane module while performing back-pressure washing and air cleaning simultaneously, it has been understood from FIG. 6 that the following adjustment is required in order to supply, into the hollow fiber membrane module, air supplied from the lower side (the lower side surface nozzle) of the hollow fiber membrane module: the rate of liquid discharge from the lower side (the lower side face nozzle) of the hollow fiber membrane module is adjusted to satisfy a relational expression of $V < S \times 5.5 \times L^{0.5}$.

Next, the raw liquid valve 2 and the filtrate valve 5 were opened, using a single external-pressure type PVDF ultrafiltration hollow fiber membrane module as illustrated in FIG. 1. In the module, a maximum value out of respective minimum diameters of aeration hole regions was 0.01 m at the time of discharging the liquid from the lower side (the lower end face nozzle) of the hollow fiber membrane module in cleaning, and the total sectional area of the aeration hole regions was 0.0035 m$^2$. In this way, river water was filtrated at a filtration flux of 3 m$^3$/(m$^2$·d) in a constant-flow rate manner.

After 30 minutes from the start of the constant-flow rate filtration, the raw liquid valve 2 and the filtrate valve 5 were closed, and then the air release valve 4, the lower waste cleaning liquid valve 14, the backwash valve 8 and the air-scrub valve 12 were opened to activate the backwash pump 7 and the air blower 11, thereby performing the following simultaneously over 60 seconds: back-pressure washing of transmitting a backwashing liquid from the filtrate side of the hollow fiber membrane module 3 into the raw liquid side thereof at a flux of 3.3 m$^3$/(m$^2$·d); and air cleaning of supplying air through the lower end face nozzle of the hollow fiber membrane module 3 thereinto at an air flow rate of 100 NL/min.

At this time, in order to supply the air supplied from the lower side (the lower end face nozzle) of the hollow fiber membrane module to the hollow fiber membrane module, the flow rate in the lower liquid discharge port (lower end face nozzle) was adjusted to set the rate of liquid discharge when the liquid was discharged from the lower side of the hollow fiber membrane module (that is, the rate of liquid discharge through the lower end face nozzle) to 0.001 m$^3$/sec.

In this case, V was 0.001 m$^3$/sec, S was 0.0035 m$^2$, Lmax was 0.01 m, and S×5.5×Lmax$^{0.5}$ was 0.001925. Thus, the rate of liquid discharge V through the lower end face nozzle satisfied the following relational expression: $0.00001 \leq V < S \times 5.5 \times Lmax^{0.5}$.

Thereafter, the backwash valve 8 was closed to stop the backwash pump 7, and the air release valve 4, the lower waste cleaning liquid valve 14 and the air-scrub valve 12 were opened to activate the air blower 11. While this state was kept, the internal liquid in the hollow fiber membrane module 3 was discharged. At this time, in order to supply the air supplied through the lower end face nozzle of the hollow fiber membrane module 3 to the hollow fiber membrane module 3, the flow rate adjusting valve 15 was used to adjust the rate of liquid discharge to set the rate of liquid discharge V through the lower end face nozzle to 0.001 m³/sec.

Thereafter, at the same time with closing of the lower waste cleaning liquid valve 14, the raw liquid valve 2 was opened to activate the raw liquid supplying pump 1, thereby filling the primary side of the membranes in the hollow fiber membrane module 3 with the raw liquid. Thereafter, the filtrate valve 5 was opened and the air release valve 4 was closed to return the process to the filtrating step. These steps were repeated. As a result, the filtration differential pressure in the hollow fiber membrane module 3 was 40 kPa even after one month while the differential pressure was 30 kPa immediately after the start of the operation of the apparatus. Thus, the apparatus was safely operated over a long term.

Example 2

In the apparatus illustrated in FIG. 1, a single external-pressure type PVDF ultrafiltration hollow fiber membrane module was used in which a maximum value out of respective minimum diameters of aeration hole regions was 0.01 m at the time of discharging liquid through the lower end face nozzle of the hollow fiber membrane module in cleaning, and the total sectional area of the aeration hole regions was 0.0035 m². The raw liquid valve 2 and the filtrate valve 5 were opened to filtrate river water at a filtration flux of 3 m³/(m²·d) in a constant-flow rate manner.

After 30 minutes from the start of the constant-flow rate filtration, the raw liquid valve 2 and the filtrate valve 5 were closed, and then the air release valve 4, the backwash valve 8 and the air-scrub valve 12 were opened to activate the backwash pump 7 and the air blower 11, thereby performing the following simultaneously over 60 seconds: back-pressure washing of transmitting a backwashing liquid from the filtrate side of the hollow fiber membrane module 3 into the raw liquid side thereof at a flux of 3.3 m³/(m²·d); and air cleaning of supplying air through the lower end face nozzle 19 of the hollow fiber membrane module 3 thereinto at an air flow rate of 100 NL/min.

Thereafter, the backwash valve 8 was closed to stop the backwash pump 7, and the air release valve 4, the lower waste cleaning liquid valve 14 and the air-scrub valve 12 were opened to activate the air blower 11. While this state was kept, the internal liquid in the hollow fiber membrane module 3 was discharged. At this time, as the internal liquid was discharged, the liquid level of the hollow fiber membrane module 3 was lowered.

At this time, in order to supply the air supplied through the lower end face nozzle of the hollow fiber membrane module 3 to the hollow fiber membrane module 3, the flow rate adjusting valve 15 was used to adjust the rate of liquid discharge to set the rate of liquid discharge through the lower end face nozzle 19 to 0.001 m³/sec.

Thereafter, at the same time with closing of the lower waste cleaning liquid valve, the raw liquid valve 2 was opened to activate the raw liquid supplying pump 1, thereby filling the primary side of the membranes in the hollow fiber membrane module 3 with the raw liquid. Thereafter, the filtrate valve 5 was opened and the air release valve 4 was closed to return the process to the filtrating step. These steps were repeated. As a result, the filtration differential pressure in the hollow fiber membrane module 3 was 44 kPa even after one month while the differential pressure was 30 kPa immediately after the start of the operation of the apparatus. Thus, the apparatus was safely operated over a long term.

Comparative Example 1

Comparative Example 1 described below was performed to check advantageous effects in the case of performing simultaneous air cleaning/back-pressure washing without discharging the back-pressure washing waste cleaning liquid from the lower side (the lower end face nozzle) of the hollow fiber membrane module at the time of cleaning.

In the apparatus illustrated in FIG. 1, a single hollow fiber membrane module equivalent to any one of the modules in Example 1 was used. The raw liquid valve 2 and the filtrate valve 5 were opened to filtrate river water at a filtration flux of 3 m³/(m²·d) in a constant-flow rate manner.

After 30 minutes from the start of the constant-flow rate filtration, the raw liquid valve 2 and the filtrate valve 5 were closed, and subsequently the air release valve 4, the backwash valve 8 and the air-scrub valve 12 were opened to activate the backwash pump 7 and the air blower 11, thereby performing the following simultaneously over 60 seconds: back-pressure washing of transmitting a backwashing liquid from the filtrate side of the hollow fiber membrane module 3 into the raw liquid side thereof at a flux of 3.3 m³/(m²·d); and air cleaning of supplying air through the lower end face nozzle of the hollow fiber membrane module 3 thereinto at an air flow rate of 100 NL/min.

Thereafter, the liquid discharging valve 13 was opened to discharge the total amount of the liquid at the primary side of the membranes in the hollow fiber membrane module 3. Thereafter, at the same time with closing of the liquid discharging valve 13, the raw liquid valve 2 was opened to activate the raw liquid supplying pump 1, thereby filling the primary side of the membranes in the hollow fiber membrane module 3 with the raw liquid. Thereafter, the filtrate valve 5 was opened and the air release valve 4 was closed to return the process to the filtrating step. These steps were repeated. As a result, the filtration differential pressure in the hollow fiber membrane module 3 ascended to 74 kPa after one month while the differential pressure was 30 kPa immediately after the start of the operation of the apparatus. Thus, the ascending rate of the filtration differential pressure became about four times larger than that in Example 1. It has been therefore understood that this comparative example made it impossible to operate the apparatus stably.

Comparative Example 2

Comparative Example 2 described below was performed to check advantageous effects in the case of performing simultaneous air cleaning/back-pressure washing in the state of making the rate of liquid discharge V through the lower end face nozzle larger than $S \times 5.5 \times L_{max}^{0.5}$ at the time of the cleaning.

As has been illustrated in FIG. 1, a single hollow fiber membrane module equivalent to any one of the modules in Example 1 was used. The raw liquid valve 2 and the filtrate valve 5 were opened to filtrate river water at a filtration flux of 3 m³/(m²·d) in a constant-flow rate manner.

After 30 minutes from the start of the constant-flow rate filtration, the raw liquid valve 2 and the filtrate valve 5 were closed, and subsequently the air release valve 4, the lower waste cleaning liquid valve 14, the backwash valve 8 and the air-scrub valve 12 were opened to activate the backwash pump 7 and the air blower 11, thereby performing the following simultaneously over 60 seconds: back-pressure washing of transmitting a backwashing liquid from the filtrate side of the hollow fiber membrane module 3 into the raw liquid side thereof at a flux of 3.3 m³/(m²·d); and air cleaning of supplying air through the lower end face nozzle of the hollow fiber membrane module 3 thereinto at an air flow rate of 100 NL/min.

In this period, the rate of liquid discharge through the lower end face nozzle was not adjusted when the liquid was discharged from the lower side (the lower end face nozzle) of the hollow fiber membrane module. In this period, the rate of liquid discharge through the lower end face nozzle was 0.0022 m³/sec.

In this case, V was 0.0022 m³/sec, S was 0.0035 m², Lmax was 0.01 m, and S×5.5×Lmax$^{0.5}$ was 0.001925. Thus, the rate of liquid discharge V through the lower end face nozzle did not satisfy the following relational expression: $0.00001 \leq V < S \times 5.5 \times Lmax^{0.5}$.

Thereafter, the backwash valve 8 was closed to stop the backwash pump 7, and the air release valve 4, the lower waste cleaning liquid valve 14 and the air-scrub valve 12 were opened to activate the air blower 11. While this state was kept, the internal liquid in the hollow fiber membrane module 3 was discharged. In this period also, the rate of liquid discharge was not adjusted when the internal liquid was discharged through the lower end face nozzle 19 of the hollow fiber membrane module 3.

Thereafter, at the same time with closing of the lower waste cleaning liquid valve 14, the raw liquid valve 2 was opened to activate the raw liquid supplying pump 1, thereby filling the primary side of the membranes in the hollow fiber membrane module 3 with the raw liquid. Thereafter, the filtrate valve 5 was opened and the air release valve 4 was closed to return the process to the filtrating step. These steps were repeated. As a result, the filtration differential pressure in the hollow fiber membrane module 3 ascended rapidly to 160 kPa after 10 days from the start of the operation of the apparatus while the differential pressure was 30 kPa immediately after the start of the operation of the apparatus. Thus, the ascending rate of the filtration differential pressure became about 40 times larger than that in Example 1. It has been therefore understood that this comparative example made it impossible to operate the apparatus stably.

DESCRIPTION OF REFERENCE SIGNS

1: Raw liquid supplying pump
2: Raw liquid valve
3: Hollow fiber membrane module
4: Air release valve
5: Filtrate valve
6: Filtrate storage tank
7: Backwash pump
8: Backwash valve
9: Chemical liquid supplying pump
10: Chemical liquid storage tank
11: Air blower
12: Air-scrub valve
13: Liquid discharging valve
14: Lower waste cleaning liquid valve
15: Flow rate adjusting valve
16: Upper side face nozzle
17: Lower side face nozzle
18: Upper end face nozzle
19: Lower end face nozzle
20: Upper membrane-bonded section
21: Lower membrane-bonded section
22: Aeration hole

The invention claimed is:

1. A method for cleaning a hollow fiber membrane module, the module comprising:
   a cylindrical case comprising a) to c):
      a) an upper side face nozzle and a lower side face nozzle in a side face thereof,
      b) an upper end face nozzle in an upper end face, and
      c) a lower end face nozzle in a lower end face; and
   a hollow fiber membrane bundle comprising a plurality of hollow fiber membranes and inserted into the cylindrical case,
   wherein:
   in an upper end portion of the hollow fiber membrane bundle, an upper membrane-bonded section is formed, the upper membrane-bonded section being bonded and fixed to the cylindrical case with an adhesive in a state where upper end faces of the hollow fiber membranes are opened;
   in a lower end portion of the hollow fiber membrane bundle, a lower membrane-bonded section is formed, the lower membrane-bonded section being bonded and fixed to the cylindrical case with an adhesive in a state where lower end faces of the hollow fiber membranes are closed; and
   a plurality of aeration holes are made in the lower membrane-bonded section; and
   in the method, while air is supplied through the lower end face nozzle, an internal liquid inside the cylindrical case is discharged through the lower end face nozzle in state where the upper side face nozzle is open; and the internal liquid at a raw liquid side of the hollow fiber membranes in the cylindrical case is discharged through the lower end face nozzle to cause the rate of liquid discharge V (m³/sec) of the internal liquid to satisfy the following relational expression relatively to a maximum value Lmax (m) out of respective minimum diameters of the aeration holes, wherein the minimum diameter of an aeration hole is equal to the minimum width of the aeration hole in a direction perpendicular to the direction of liquid discharged in the aeration hole, and the total sectional area S (m²) of the aeration holes, thereby air-cleaning the hollow fiber membrane module: $0.00001 \text{ (m}^3/\text{sec)} \leq V \text{ (m}^3/\text{sec)} < S \text{ (m}^2) \times 5.5 \text{ (m}^{0.5}/\text{sec)} \times Lmax^{0.5} \text{(m}^{0.5})$.

2. The method for cleaning a hollow fiber membrane module according to claim 1, wherein the cleaning recited in claim 1 is performed while a liquid level of the internal liquid in the cylindrical case is lowered.

3. The method for cleaning a hollow fiber membrane module according to claim 1, wherein the cleaning recited in claim 1 is performed while back-pressure washing is performed, the back-pressure washing being washing of supplying a backwashing liquid through the upper end face nozzle to be transmitted from a filtrate side of the hollow fiber membrane to a raw liquid side thereof.

* * * * *